G. E. WUNDER.
PORTABLE ELEVATOR.
APPLICATION FILED SEPT. 24, 1908.
959,679. Patented May 31, 1910.
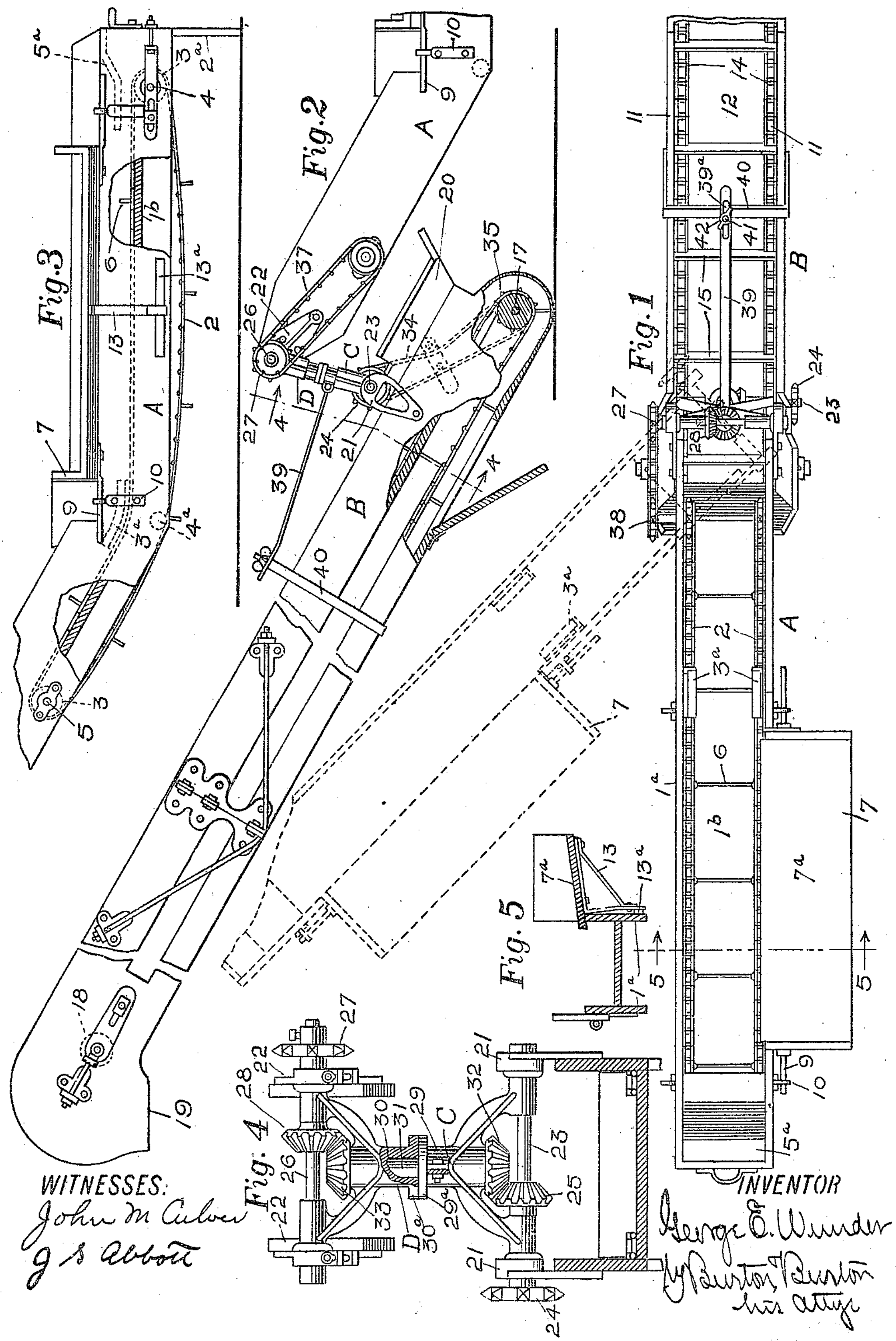
ANDREW B. GRAHAM CO., PHOTO-LITHOGRAPHERS, WASHINGTON, D. C.

UNITED STATES PATENT OFFICE.

GEORGE E. WUNDER, OF MELVIN, ILLINOIS, ASSIGNOR TO INDEPENDENT HARVESTER COMPANY, OF PLANO, ILLINOIS, A CORPORATION OF MAINE.

PORTABLE ELEVATOR.

959,679. Specification of Letters Patent. Patented May 31, 1910.

Application filed September 24, 1908. Serial No. 454,643.

*To all whom it may concern:*

Be it known that I, GEORGE E. WUNDER, a citizen of the United States, residing at Melvin, in the county of Ford and State of Illinois, have invented new and useful Improvements in Portable Elevators, of which the following is a specification, reference being had to the accompanying drawings, forming a part thereof.

The purpose of this invention is to provide a portable apparatus especially adapted for receiving material dumped from a wagon and elevating it for discharge into a bin or other place of accumulation. It is particularly designed for handling farm products, but is adapted equally for handling sand, gravel, cement and the like.

It consists of the structure shown and described as indicated in the claims.

In the drawings:—Figure 1 is a plan view of the structure embodying this invention having a portion broken away at one end. Fig. 2 is a side elevation of the same having a portion broken away at the other end. Fig. 3 is a detail side elevation of a portion of the device, comprising the portion broken away from Fig. 2. Fig. 4 is a section at the line 4—4 on Fig. 2. Fig. 5 is a detail section at the line 5—5 on Fig. 1.

The structure illustrated containing this invention comprises two conveyer elements, one of which is adapted to receive a load dumped in it from a wagon, and convey it first horizontally and then upward in an inclined direction for a short distance for delivering into the second element, which is an inclined elevator overhung by the first element and pivotally related to the first, so that it may conduct the material either in the direction of the first or in direction at an angle thereto for delivery into the bin or other receptacle. The first of these two elements, A, comprises a trough, 1, having supporting legs, $2^a$, at one end, extending horizontally for a distance which is preferably somewhat greater than the width of a wagon box, and is then deflected upward at an angle of about thirty degrees from the horizontal and terminates open at the higher end for delivery into the second element, the elevator, B. The sides, $1^a$, of the trough extend down past the bottom, $1^b$, forming a downwardly open channel or guarded space for the return ply of the conveyer chains, 2, 2, which travel about sprocket wheels, 3, 3, on the shafts, 4, and 5, the former journaled in the sides of the trough near the end of the horizontal portion and the latter in the sides near the elevated end, both shafts being at such position below the level of the bottom, $1^b$, that the upper ply of the chain extends tangentially from the sprocket wheels on to the upper surface of the trough bottom. At the angle between the horizontal and the inclined portions of the trough, there are mounted on the sides guide shoes, $3^a$, $3^a$, for deflecting the upper ply of the chains to cause them to travel along the bottom and not to extend in straight line from sprocket wheel to sprocket wheel. Below the bottom opposite the shoes, there is provided a guide roll, $4^a$, to perform the like service of deflecting the return ply of the chain.

$5^a$ represents a shield which overhangs the conveyer at the entering end and constitutes a chute board for directing any material which might be dumped too near the receiving end on to the conveyer as it emerges from under the shield. The conveyer chains are connected by feed vanes or blades, 6, which travel on the bottom of the trough, standing erect therefrom for a sufficient depth to adapt them to engage and conduct the material. The chute board, $5^a$, is spaced up from the conveyer chains sufficiently to accommodate these feed blades.

7 is a loading trough adapted to be mounted on either of the sides, $1^a$, of the horizontal portion of the conveyer trough, with its inclined bottom, $7^a$, overhanging the edge of the trough for delivery thereinto. This loading trough is designed to be the full width of a wagon box, and is detachably mounted, as described, on the side of the horizontal conveyer trough by means of long gudgeons, 9, secured at two ends and engaging with bracket eyes, 10, 10, which are bolted on to the side of the conveyer trough and spaced apart a distance substantially equal to the length of one of the gudgeons so that the loading trough may be adjusted along the conveyer a distance substantially equal to one gudgeon length. The purpose of this is to avoid the necessity of having the wagon from which the load is to be received driven or backed to an exact position against the side of the conveyer. An approximately correct position being reached, the loading trough may be adjusted so as to be overhung accurately by the end of the wagon. A bracket, 13, projecting downward from the bottom of the loading trough about midway between its ends bears at its lower end against and slides upon a wearing plate, $13^a$, secured to the side of the conveyer trough.

The second element of the structure, the elevator, B, consists of a frame or casing comprising sides, 11, 11, of a trough, a trough bottom, 12, which is a diaphragm extending longitudinally and connecting the sides about midway between the upper and lower edges forming a runway for the upper ply of the endless feed chains, 14, which are provided with feeding blades, 15, extending up from and running upon the diaphragm bottom, 12. The feed chains are driven by sprocket wheels, 16, on a lower shaft, 17, and are guided around the sprocket wheels, 18, at the upper end of said inclined element or elevator, B, of which the casing terminates at the upper end in a downwardly open spout or discharge mouth, 19, for delivering the material handled into the receptacle or place of accumulation. The elevator casing is closed at the lower end about the path of the feeding blades, 15, and at the upper side of the elevator casing at that end there is provided a hopper, 20, which is overhung by the discharge end of the casing of the lower element or conveyer, A, so that the material fed in said lower element may be delivered into such hopper by which it is gathered for discharge into the elevator trough onto the trough bottom or diaphragm, 12, around whose lower end the feed chains ascend with the feeding blades, 15, for engaging the material to carry and propel it upward along the upper side of said elevator trough bottom or diaphragm, 12. The lower closed end of the elevator casing is designed to rest upon the ground and thus afford support for the overhanging elevated end of the casing of the conveyer, A.

The casings of the two elements, A and B, are pivotally connected together for adjustment about an axis transverse to both of them at substantially the middle of their width by the means which also affords support for the overhanging end of the conveyer casing upon the overhung end of the elevator casing. This means consists in a two-part gearing frame comprising two members, C and D. The lower member, C, has horizontal pivotal connection to the bracket ears, 21, 21, rigidly secured to the sides of the elevator casing; and the upper member, D, at its upper end has horizontal pivotal connection to bracket plates, 22, rigidly secured to the sides of the casing of the conveyer, A. In the lower gearing frame member, C, there is journaled at the axis of the pivotal connection of said member to the bracket ears, 21, a shaft, 23, which extends through said ears, and which may serve as the pivot. This shaft has at one end outside the bracket ear a sprocket wheel, 24, and between its bearings in said gearing frame member, C, a bevel gear, 25. In the gearing frame member, D, there is journaled at the axis of the pivotal connection with the bracket plate, 22, a shaft, 26, extending through said bracket plates, and which may constitute the pivotal connection of said gearing frame member to said plates, and thereby to the casing of the conveyer element, A. The shaft, 26, has at one end outside one of the bracket plates, 22, a sprocket wheel, 27, and intermediate its bearings on the member, D, a bevel gear wheel, 28. The members, C and D, have respectively bearings, 29 and 30, at right angles to the bearings of the shafts, 23 and 26, said bearings, 29 and 30, terminating in flanges, $29^a$ and $30^a$, which seat upon each other, and the two members are pivoted together by means of a shaft, 31, which extends through said bearings, and at opposite ends, beyond the bearings respectively, has rigid with it beveled gears, 32 and 33, meshing respectively with beveled gears, 25 and 28, on their respective shafts, 23 and 26. This pivotal connection of the two members, C and D, constitutes the pivotal connection of the two conveyer and elevator members, A and B, and adapts the elevator member, A, to be swung about such pivot at least 180 degrees; that is, from a position extending at right angles from one direction of the member, B, to a position extending at right angles in the opposite direction. A drive chain, 34, extends about the sprocket wheel, 24, and about a sprocket wheel, 35, on the end of the conveyer driving shaft, 17, of the elevator, B, and a chain, 37, extends about the sprocket wheel, 27, and a sprocket wheel, 38, on the end of the conveyer driving shaft, 5, in the element, A. Power may be communicated to the entire train by a coupling to any one of the shafts,—5, 17, 23 or 26,—as may be found most convenient, and each of said shafts is preferably extended as illustrated for such coupling.

The member, C, is braced for insuring rigidity with the elevator member, B, by means of a tie rod and brace bar, 39, connected to a lug on said member, C, and to a yoke or bail, 40, which strides the elevator frame and is rigid therewith at a distance upward from the lower receiving end of the elevator. This brace bar is slotted at $39^a$ for engagement with the stud bolt, 41, which extends through the slot and is provided with an inner nut, 42, for clamping the brace bar to secure it at any position within the range of adjustment provided by the slot.

It will be seen that the three pivots in the connection between the members, A and B, permit the adjustment of the elevator at varying inclinations in order that the discharge end may be at the desired height for delivering to the receptacle and at varying angles to the other element, A, so that the entire device may be positioned conveniently, both with respect to the roadway on which the wagon may be driven for dumping into the horizontal end of the conveyer, A, and with respect to the point at which the discharge is to be made into the receptacle. The facility for horizontal adjustment of the two members in respect to each other has another advantage in that it permits the element, A, to be swung around parallel to the road on which the wagon is to be driven for dumping, and then swung back behind the wagon to the proper position for receiving the discharge from the tail end of the wagon box, thus avoiding the necessity of backing up the wagon to the device when this is inconvenient.

I claim:—

1. A portable conveyer and elevator comprising a conveyer having one end elevated; an elevator having its receiving end overhung by the discharge end of the conveyer; a gearing frame comprising two members connected respectively to the conveyer and to the elevator; a shaft journaled in both said members and constituting the pivotal connection between them, the two members being parted intermediate the ends of said shaft transversely thereto, and flanged at their parting plane for stopping one against the other and turning one upon the other.

2. In combination with a conveyer casing and an elevator casing, a conveying and elevating mechanism in said casings respectively, the discharge end of the conveyer being positioned for delivering by gravity into the receiving end of the elevator; a gearing frame which connects the two casings where the one overhangs the other, comprising two members which are pivotally connected for swiveled action about the axis transverse to both conveyers; a shaft journaled in both said members at their swiveled axis; conveyer operating trains in the two members respectively, and gears fast on the opposite ends of said shaft and constituting the steps for the shaft in its bearings in said two members respectively for retaining said two members together, said two members meeting end to end between the gears, and flanged at their said meeting ends transversely to the axis of the shaft.

In testimony whereof, I have hereunto set my hand at Paxton, Illinois, this 19 day of September, 1908.

G. E. WUNDER.

Witnesses:
R. L. SCHNEIDER,
C. S. SCHNEIDER.